(No Model.) 2 Sheets—Sheet 1.

T. H. PALMER.
DESK, TOILET, AND DISPLAY BOTTLE.

No. 438,016. Patented Oct. 7, 1890.

WITNESSES:
John M. Deemer
C. Sedgwick

INVENTOR:
T. H. Palmer
BY
Munn & Co.
ATTORNEYS (No Model.) 2 Sheets—Sheet 2.
T. H. PALMER.
DESK, TOILET, AND DISPLAY BOTTLE.
No. 438,016. Patented Oct. 7, 1890.
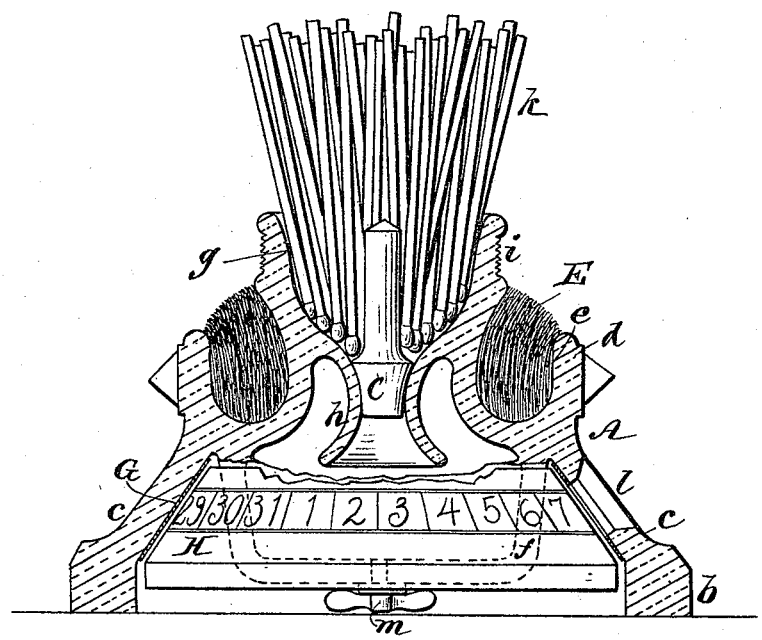
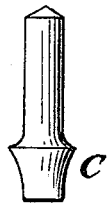
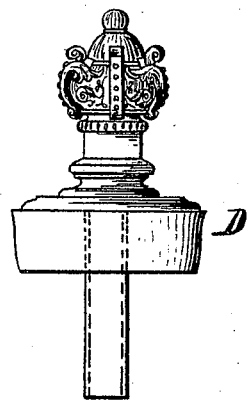
WITNESSES:
INVENTOR:
ATTORNEYS

UNITED STATES PATENT OFFICE.

THERON H. PALMER, OF SAN BERNARDINO, CALIFORNIA.

DESK, TOILET, AND DISPLAY BOTTLE.

SPECIFICATION forming part of Letters Patent No. 438,016, dated October 7, 1890.

Application filed August 6, 1890. Serial No. 361,180. (No model.)

*To all whom it may concern:*

Be it known that I, THERON HENRY PALMER, of the city and county of San Bernardino, and State of California, have invented a new and useful Improvement in Desk, Toilet, and Display Bottles, of which the following is a full, clear, and exact description.

My invention consists in a glass bottle of novel construction, substantially as hereinafter shown and described, capable of various uses for office, domestic, or toilet purposes and as a calendar and advertising medium.

Reference is to be had to the accompanying drawings, forming a part of this specification, in which similar letters of reference indicate corresponding parts in all the figures.

Figure 1:
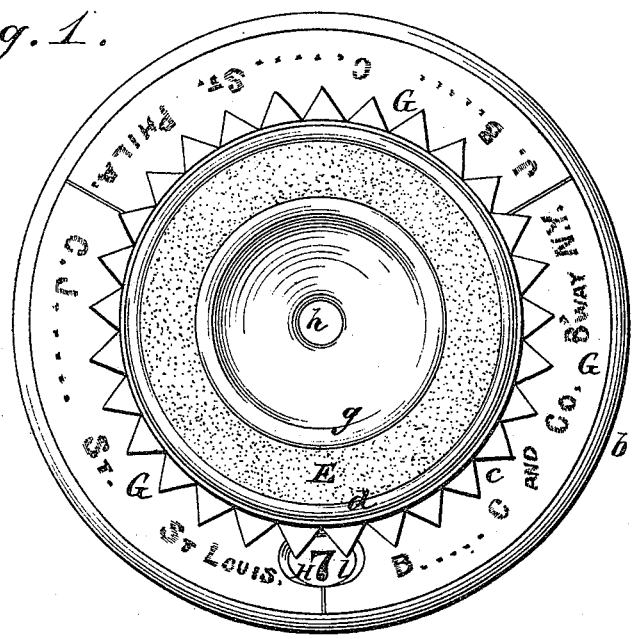
Figure 2:
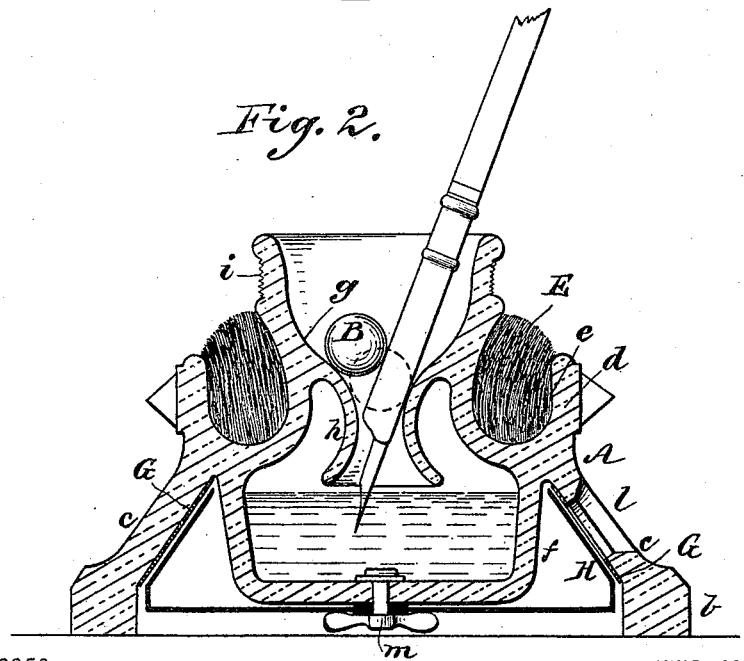

Figure 1 represents a plan view of my improved bottle, mainly showing its use as a pin-cushion or pen-wiper and calendar, but more especially as an advertising device. Fig. 2 is a vertical section of the same, showing its use as an ink-bottle, pen-wiper, or pin-cushion, calendar, and advertising device. Fig. 3 is a vertical section of the same bottle, showing its use as a paper-weight, match-safe, and match-lighter, pen-wiper, or pin-cushion, calendar, and advertising medium. Fig. 4 is a view in elevation of the stopper detached used in the bottle when applied as shown in Fig. 3, and Fig. 5 is a view in elevation of a different form of stopper when the bottle is designed to be used as a perfumery one; also as a pin and needle cushion for ladies' toilet purposes and office use, and as a calendar and advertising medium.

A indicates the body of the bottle, having an enlarged circular base $b$, open below and with partially sloping or converging sides $c$, terminating above in an upright portion $d$, that has an annular recess $e$ in it opening above, and which portion is extended below and above to form an interior well $f$ and throat or mouth piece $g$. The throat or mouth piece $g$ is of peculiar construction, being made internally with an upwardly tapering or enlarging body terminating below in a contracted reversely tapering or curving neck $h$, which latter is capable of being closed either by a loose ball-valve B when the bottle is used as an inkstand in common with other uses for it, as shown in Fig. 1, or by a tapering stopper C, having an upright stem or handle when the bottle is used as a match-safe, in addition to the other purposes or uses shown and described for it with reference to Fig. 3, or the upper enlarged portion of the mouth-piece $g$ may be closed by a bung-shaped stopper D, entering down within and fitting said mouth-piece and fitting by a lower stem-extension the neck $h$ when the well $f$ of the bottle is used to hold perfumery instead of ink.

The recess $e$ in the upright portion $d$ of the bottle is used to hold redwood bark or other filling E, suitable to act as a pen-wiper or pin and needle cushion, according to the several purposes the bottle is intended to be used for. The exterior of the mouth-piece $g$ has a roughened surface $i$, suitable for lighting friction-matches on when the bottle is used in part as a safe for holding such matches, as shown in Fig. 3, the stopper C then being used and forming by its upper stem or handle a central divider or separator of the matches $k$.

A spy-hole $l$ is formed in one portion of the inclined sides $c$ of the bottle, the use of which will be hereinafter explained.

The bottle is or may be made all in one piece, including its base $b$, sloping sides $c$, upper recessed portion $d$, mouth-piece $g$, with attached neck $h$, and well $f$.

Introduced within the base $b$, so as to lie up against the interior surface of the sloping glass sides $c$, are any number of printed advertising-cards G, which should be pasted on the glass. This not only serves the purpose of displaying the advertising-cards, but also of covering up the dates or figures of a calendar from view, excepting at the sight or spy hole $l$, where the current date on the calendar is made visible, as shown in Fig. 1. The calendar H is in the form of a hollow frustum of a cone pressed into shape from a sheet of tin and a strip of the same metal soldered across the bottom of it and the whole attached to the bottom of the well $f$, as by a central turning device $m$, to provide for the adjustment of the calendar around and at the back of the spy-hole $l$ to expose the particular day of the month through said hole. The figures or dates on the calendar are printed on a properly-formed piece of paper and pasted on the outer surface of the conical body of the calendar, which conforms and lies in proximity to the sloping sides c of the bottle, or the figures may be painted or provided directly on the exterior surface of the conical metal body of the calendar.

Having thus described my invention, what I claim as new, and desire to secure by Letters Patent, is—

1. As a new article of manufacture, the within-described bottle, having its body constructed with an upright portion d, having an annular recess e in it open above and adapted to hold a flexible filling, a lower interior well f, and an enlarged upper tapering mouth-piece g, having a lower tapering neck h and adapted to receive stoppers of different construction, essentially as and for the purpose herein set forth.

2. As a new article of manufacture, the within-described bottle, having its body constructed with an open bottom b, sloping lower transparent sides c, having a spy or sight hole l, an upright portion d, having an annular recess e in it open above and adapted to hold a flexible filling, a lower interior well f, and an enlarged upper tapering mouth-piece g, having a lower tapering neck h and adapted to receive stoppers of different construction, essentially as and for the purpose herein set forth.

3. The combination, with the bottle having an open bottom and circular lower transparent sides c, provided with a spy or sight hole l and adapted to display interior advertising-cards, of the conically-shaped and rotatable calendar H, substantially as shown and described.

THERON H. PALMER.

Witnesses:
W. S. HOOPER,
E. A. HOLT.